(12) United States Patent
Crossland et al.

(10) Patent No.: US 6,285,345 B1
(45) Date of Patent: Sep. 4, 2001

(54) LIQUID CRYSTAL DISPLAY

(75) Inventors: William A Crossland, Harlow;
Anthony B Davey, Bishops Stortford;
Vincent G Geake, Thriplow; Ian D Springle, Congleton, all of (GB)

(73) Assignee: The Secretary of State for Defence in Her Britannic Majesty's Government of The United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/171,463
(22) PCT Filed: Apr. 18, 1997
(86) PCT No.: PCT/GB97/01092
§ 371 Date: Oct. 29, 1998
§ 102(e) Date: Oct. 29, 1998
(87) PCT Pub. No.: WO97/40417
PCT Pub. Date: Oct. 30, 1997

(30) Foreign Application Priority Data

Apr. 19, 1996 (GB) ................................... 9608114

(51) Int. Cl.$^7$ ...................................................... G09G 3/34
(52) U.S. Cl. ............................. 345/87; 349/62; 359/237
(58) Field of Search ............................. 345/87; 349/61, 349/62, 69; 359/237, 350, 359

(56) References Cited

U.S. PATENT DOCUMENTS 6,014,192 * 1/2000 Lehureau et al. ...................... 349/62
6,078,421 * 6/2000 Davey et al. ........................ 359/237

FOREIGN PATENT DOCUMENTS

WO 95/27920 * 10/1995 (WO) ........................... G02F/1/1335
95 27920    10/1995 (WO) ........................... G02F/1/1335

OTHER PUBLICATIONS

Xerox Disclosure Journal, vol. 5, No. 5, Sep. 1980, USA, pp. 561–562, XP002034530 Gar A. Dir: Twisted Nematic Display with Alignement Technique see p. 561.

* cited by examiner

Primary Examiner—Amare Mengistu
(74) Attorney, Agent, or Firm—Nixon & Vanderhye P.C.

(57) ABSTRACT

A liquid crystal display of the UV-phosphor type comprises a light source 1 for producing activation light at a predetermined narrow range of UV wavelengths, a collimator 3 for directing the activation light in parallel in a predetermined direction, a LC cell 5 formed from an array of pixels, a photoluminescent screen (7) on the cell arranged to emit a visible output when struck by the narrow-band excitation light passing through the cell, and a drive circuit for addressing the LC cell in a multiplexed manner. The direction of the light and the thickness of the cell are chosen to give the best contrast ratio for the liquid crystal. Such an effect is only possible when monochromatic, collimated light is used, which for a normal display is not practical. With the phosphor-emitter configuration, on the other hand, it is ideal, and as a result without loss of contrast a much lower range of drive voltages, and hence a much greater multiplexing capability for passive-matrix displays, can be used while preserving full viewing-angle properties of the display.

13 Claims, 6 Drawing Sheets

LIQUID CRYSTAL DISPLAY

BACKGROUND OF THE INVENTION

1. Field of the Invention

This invention relates to a liquid-crystal display architecture.

2. Discussion of Prior Art

The majority of liquid-crystal displays (LCDs) currently manufactured are twist-cell displays. There are two generic types, Twisted Nematic (TN) and Super-Twisted Nematic (STN). Both involve the sandwiching of a thin (several microns) layer of nematic liquid-crystal (LC) between two flat glass plates. Both glass plates are coated on the inside with a transparent but conducting electrode layer, on top of which is deposited an alignment layer (commonly rubbed polyamide). In the locality of the alignment layer the LC molecules (which can be thought of as rod-like) tend to lie flat and point in the rubbing direction. In the TN device the rubbing directions on the top and bottom plates are perpendicular to each other and impose a 90 degree twist in the molecular LC layer. STN devices induce a twist usually greater than 180 degrees by the use of a chiral additive and the correct positioning of the rubbing directions. TN and STN are considered to represent two completely separate classes of device.

The conductive layers enable an electric field to be applied across the LC material. Such an electric field can cause the LC molecules to align themselves parallel to the field (perpendicular to the glass), destroying the twisted structure.

When in the twisted state the LC molecules tend to rotate the polarisation of incident light. This rotation no longer takes place when the application of a large enough electric field destroys the twist of the LC material. By placing twist cell devices between two linear polarisers, such polarisation modulation can be converted to a modulation of intensity.

A display comprises many such cells, or pixels, in an addressable array. If each pixel is connected directly to a dedicated drive transistor (direct drive/active matrix), the optical effect of TN devices outperforms that of STN devices. However, when arranged in a matrix of rows and columns, with single drivers at the end of each row and column (passive matrix), the STN configuration vastly outperforms the TN—it is well known that TN devices can only maintain acceptable contrast if passive-matrix multiplexed into fewer than thirty or so rows, whereas an STN display may maintain similar contrast with around 200 multiplexed rows.

STN devices have the added complication of chromaticity—they operate in either a black-and-yellow or white-and-blue mode. In order to make a true colour STN display, complicated techniques are necessary to compensate for this colour change.

Liquid-crystal displays can be either reflective or emmissive. Established twist cell LCD architectures of the emissive type use a large-area whit backlight to flood a LC shuttering layer with light. A picture can be seen by the viewer from all the angles at which light passes through the shutters. However, the quality of the picture seen tends to degrade rapidly as the viewing direction moves from the normal, an effect primarily due to the angular dependence of the LC electro-optic response.

However, it is a known phenomenon of TN LCDs that as the number of passive-matrix multiplexed lines is increased beyond the normally acceptable limits of contrast, brightness, and viewing angle there remains a small cone of angles lying off axis around which a picture can still be seen (though not visible from any other direction).

Goscianski (1977) investigated this sharpening of the TN transfer function (i.e. of the electro-optic effect) with polariser position for on-axis illumination, and developed a highly multiplexed transmissive TN display using collimated light. He pointed out that this configuration was suitable for projection displays, or with a diffuser could be used with a viewing angle of about 30°.

At about the same time, Kahn and Birecki investigated the sharpening of the transfer function with the direction of illumination, using a standard TN cell between crossed polarisers illuminated with collimated light. They identified the optimal angular range and that this could be achieved by tilting the cell.

Such displays however have not been practical, since the low range of viewing angles of these prior art devices, even with diffusers, has been too small except for use in projection displays. This situation illustrates the general point that nematic (and other liquid crystal) cells tend to have contrast ratios and multiplexability that depend strongly on the angle at which light traverses the liquid crystal layers. There is therefore a need for a display using a TN or other nematic cell which is operated and aligned optimally but with a wide viewing angle.

SUMMARY OF THE INVENTION

A liquid-crystal display according to one aspect of the invention comprises a collimator, a liquid-crystal cell exhibiting a non spherically-symmetric electro-optic effect, i.e. having contrast/multiplexability properties varying with angle of illumination, and a photoluminescent screen attached to the cell and arranged to emit a visible output when struck by substantially monochromatic excitation light passing through the cells, the collimator being arranged to direct light at the liquid-crystal cell at a narrow range of angles of incidence around a predetermined direction selected to optimise the contrast of the cell(s).

In another aspect there is provided a liquid-crystal display comprising: a light source for producing excitation light at a predetermined narrow range of wavelengths, a collimator for directing the excitation light, a LC cell formed from an array of pixels for modulating the excitation light, a photoluminescent screen on the cell arranged to emit a visible output when struck by the narrow-band excitation light passing through the cell, and a drive circuit for addressing the LC cell in a multiplexed manner: in which the liquid crystal has a range W of drive voltage over which it gives satisfactory contrast when driven in a similar multiplexed manner with white light over a range of input angles, and the drive circuit is adapted to drive the LC cell over a substantially narrower range of voltage than the range W.

Described alternatively, the display of the invention uses a liquid crystal which has a multiplex limit m when operated with white uncollimated light, but by virtue of its use with substantially monochromatic, collimated light can be driven with n multiplexed lines, with n ≯ m and preferably at least 5 times m.

The use of secondary emitters (the photoluminescent screen) for the viewed display makes it possible to optimise the input (excitation) light and the orientation of the components without restricting the viewing angle of the display or compromising the shuttering performance of the liquid crystal.

Ultra-violet Liquid-Crystal Displays (UVLCDs) are disclosed in patent application No. WO95/27920. They use phosphors to convert the internal narrow-band UV light to the coloured visible emissions observed by the viewer but do not discuss optimal configurations or drive arrangements of the liquid crystal.

This invention allow the production of passive-matrix multiplexed nematix UVLCDs with a significantly greater number of multiplexed lines than possible using conventional architectures, or even UVLC display architectures without the invention. Using conventional architectures, acceptable optical performance and viewing angle can only be maintained with up to 10 or so multiplexed lines for TN and perhaps 200 for STN.

The spectral diversity of the light used is also important; for instance, in the twisted state a TN device only induces complete 90° polarisation rotation for a single wavelength. The thickness of the cell and the birefringence of the LC material determine the value of this wavelength, at which the electro-optic performance is best. Performance at other wavelengths is not as good. For devices modulating a range of wavelengths the resulting electro-optic performance is determined by the combination of responses for each individual wavelength in the range. The cell thickness and orientation can be chosen (for a given LC material) according to the wall known Gooch & Tarry transmission criteria in order to give the best combined performance.

Twist cell LCDs currently in production are used to modulated the entire visible spectrum. This inevitably involves a comprise. With the correct choice of cell thickness, the much narrower wavelength range of activating light shuttered in UVLCDs will lead to better electro-optic performance when compared to that of a white-light modulating counterpart (all other things being equal). This is a known property of UVLCDs; the invention goes a stage further by making use of the greater design freedom available with the UVLCD configuration The decoupling action and wide angle emission of the phosphors used in UVLCDs enables all the activating light to be propagated through a liquid crystal layer at the optimum angle, while maintaining angular viewing characteristics comparable to those seen on cathode-ray-tube screens. Thus the contrast and transmission available at only a single viewing direction with a conventional display architecture would be seen over a practically 180 degree field of view using the UVLCD scheme. Furthermore the single, relatively sharp response curve thereby obtained can be uses to "tune" the addressing of the cells over a much narrower range of voltage than hitherto. It therefore becomes feasible, for the first time, to design high viewing angle, full colour passive matrix LCDs, even TN LCDs, with a high level of multiplexing.

It is expected that the invention will enable the production of TN UVLCDs with up to 150 or so (passive-matrix) multiplexed lines. Such a display will inherit the intrinsic benefits of UVLCD displays excellent viewing angle elimination of colour filters, elimination of the chromatic effects of the LC layer on the viewed colour.

Super Twisted Nematic (STN) devices have a particularly chromatic response requiring the use of complex compensating techniques to produce both black and white states in traditional LCD architectures. The use of STN devices in UVLCD architectures is particularly advantageous because it removes the need for such colour compensating techniques.

Unlike TN devices, STN devices have two regimes under which they may be multiplexed. As the twist angle is increased from 90° the sharpness of the transmission vs. applied voltage characteristic increases, and with this so too does the fast scan "rms" multiplexability of the display. When an angle of around 270° is reached this slope becomes infinite and the maximum fast scan multiplexability is achieved. For angles greater than 270° but less than or equal to 360° it is well known that two bistable states are obtained. A different multiplexing technique is used to address STN devices operating in such a bistable mode. For a UVLCD employing STN devices operating in either mode, and using the appropriate multiplexing technique, the selection of optimum angle can improve the resulting optical performance for a given level of multiplexing.

However, the invention is even more effective when used with 180° twist, an angle not normally used in conventional displays, because this is the lowest angle which has normal incidence as the optimum angle of input light entry, and because it is simple to manufacture the alignment layers for such cells.

The photoluminescent screen emits light at a different wavelength or different wavelengths to the monochromatic excitation light. This facilitates the separate optimisation of the display and the visible light. When stimulated with activating light, phosphors emit light in all directions, a feature which gives UVLCDs their inherently good viewing angle characteristics. This de-coupling of the activating light from the viewed light allows the use of a collimated UV source of activating light without loss of viewing angle.

The light source preferably emits in a narrow waveband around the predetermined wavelength, preferably in the ultra violet, further preferably in the UVA band or "sub-blue", i.e. very close to the visible spectrum.

The cell thickness should be optimised in the standard way for the predetermined wavelength and chosen illumination direction. This is done by making the thickness of the cell correspond to a minimum, usually the first or second minimum, in the curve of transmission versus thickness for the wavelength in question. The materials of a typical cell, namely the glass cover plates, the alignment layers, the liquid crystal, the electrodes and appropriate polarising and analysing elements, should be chosen to be highly transparent to and stable under the activation light, particularly when UVA is used.

The photoluminescent screen may be a uniform screen or it may comprise an array of phosphor dots. The former arrangement would be adequate for a monochrome display; likewise in the latter the phosphor dots may all emit monochromatic light when UV light is incident. Alternatively the dots may emit visible light at different wavelengths to produce a colour display.

BRIEF DESCRIPTION OF THE DRAWINGS

A particular embodiment of the invention will now be described, purely by way of example, with reference to the accompanying figures in which.

DETAILED DISCUSSION OF PREFERRED EMBODIMENTS

Figure 1:
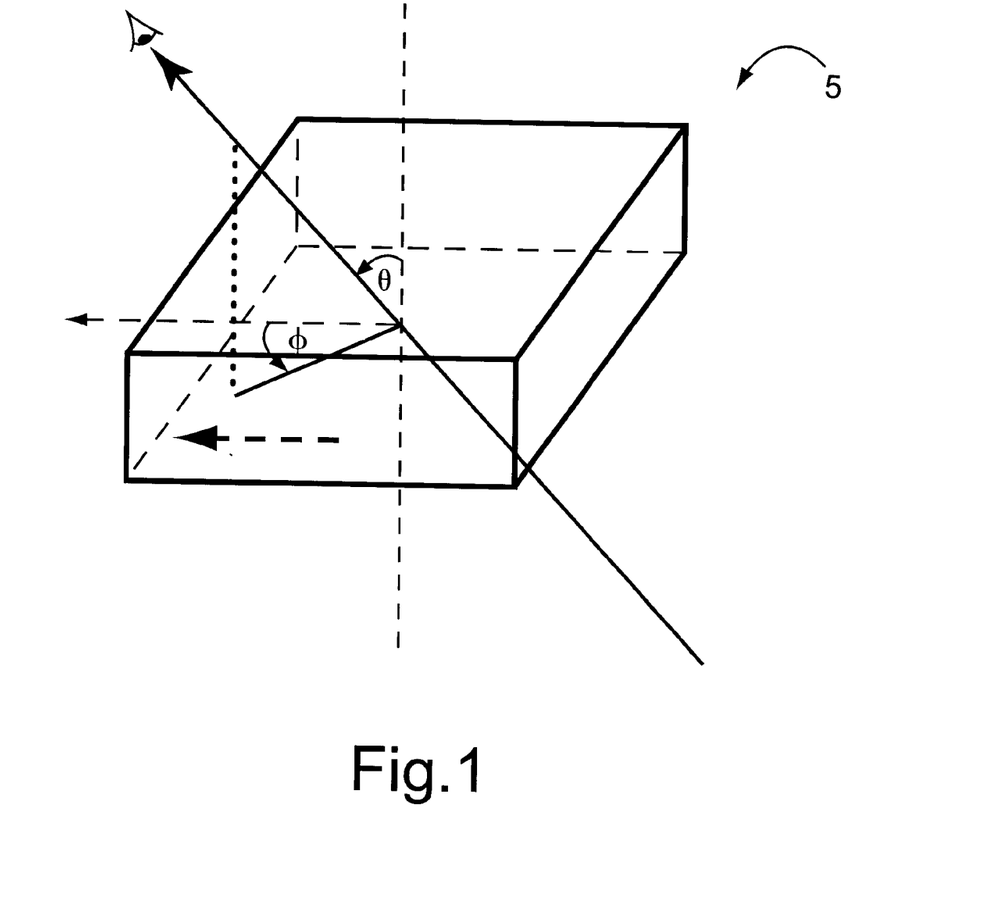
FIG. 1 illustrates the definition of the angles.

As shown in FIG. 1, the optimal viewing angle can be defined by two angles, at tilt angle θ from normal incidence and an azimuthal angle φ measured anti-clockwise viewed from the front with respect to a predetermined direction on the cell. Directions are defined as shown in FIG. 1. The tilt angle θ can be between 0° and 90°, and the azimuthal angle φ can be between −180° and 180°.

The liquid crystal cell may be a nematic, for instance a twisted or supertwisted nematic liquid crystal cell, in which the liquid crystal is aligned in the cell at both glass plates. The direction at the rear plate, i.e. the glass plate closest to the incident light, is used to define a zero azimuthal angle φ. As is known, for lower angles of twist such as a TN cell the optimum tilt angle θ will be tilted away from the normal, and generally lies between 20° and 60°. In the case of a right handed twisted nematic cell in which, viewed from the front, the front rubbing direction is twisted 90° anti-clockwise from the rear rubbing direction, this azimuthal angle φ will lie in the quadrant from 0° to 90° relative to the rear rubbing direction, and will generally be 45°±20°. In left handed cells, this azimuthal angle φ is generally −45°±20°. The predetermined illumination direction is from the rear, along the line of the optimal viewing direction.

Figure 2:
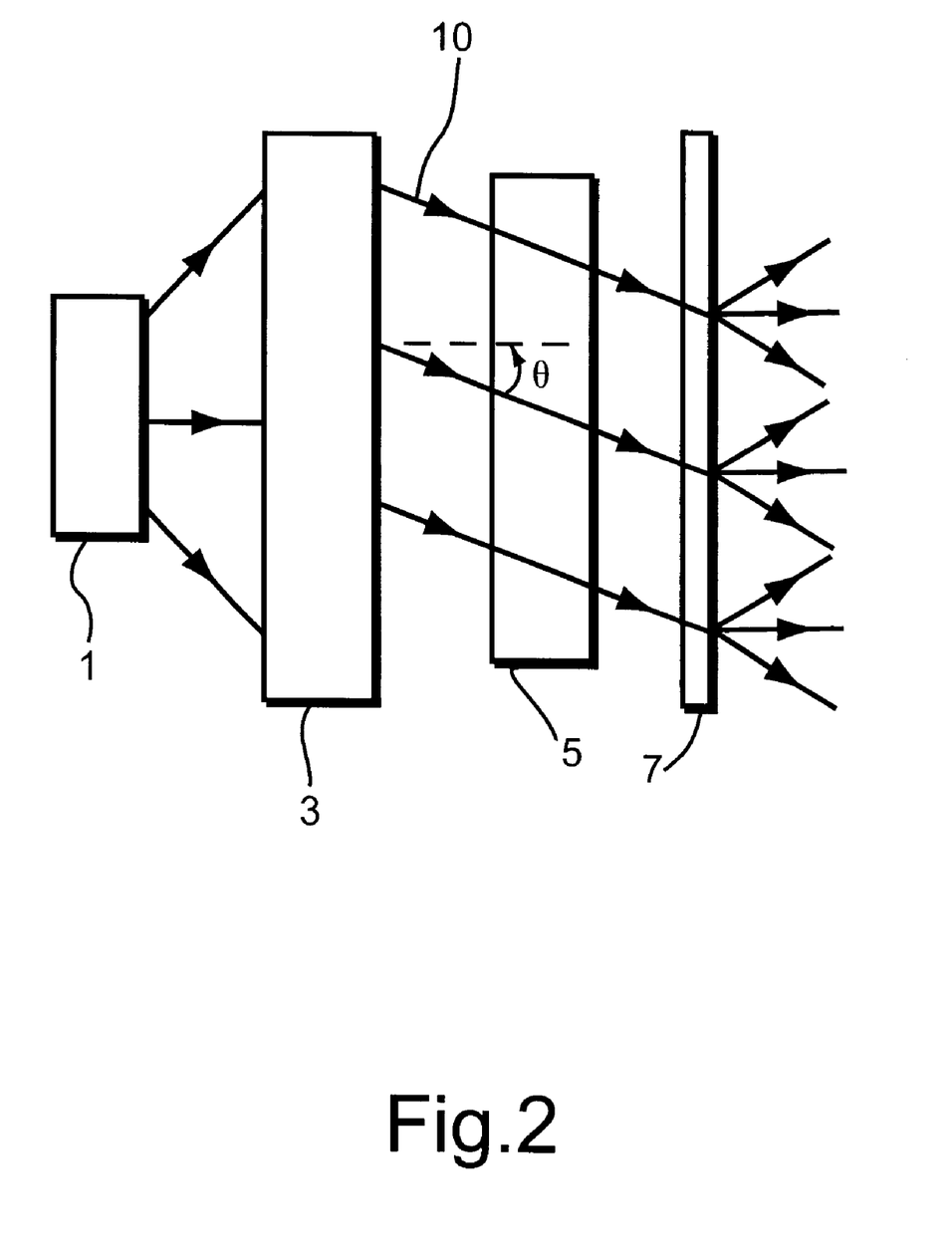
FIG. 2 shows the device of the embodiment.

As shown in FIG. 2, a narrow band UV light source 1 is provided which emits narrow band UVA light at 365 nm. The light is incident on a collimator 3 which outputs essentially collimated light 10. For a point source the collimator need only be a lens; otherwise the collimator may be of the "Spectravue" type manufactured by Allied Signal Inc., but adapted to direct light in the predetermined direction, which in this case is a tilt angle θ of 35° and an azimuthal angle φ of 45°. This direction is chosen to provide a compromise between transmission and contrast for the desired level of multiplexing.

The collimated light is incident on a multiplexed passive matrix twisted nematic liquid crystal device 5. The liquid crystal used has a low UVA absorption. The device has approximately 50 rows of cells, with a single driver transistor provided for each row and column. For larger displays further sets of cells can be provided.

The liquid crystal cells are optimised in thickness for the ultraviolet wavelength and illumination angle chosen, and the materials used are similarly chosen.

The modulated light having passed through the cell 5 is then incident on the photoluminescent screen 7. The screen is a continuous phosphor sheet that emits light when UVA light falls on it. The image on the screen is thus visible from a wide range of viewing directions.

Figure 3:
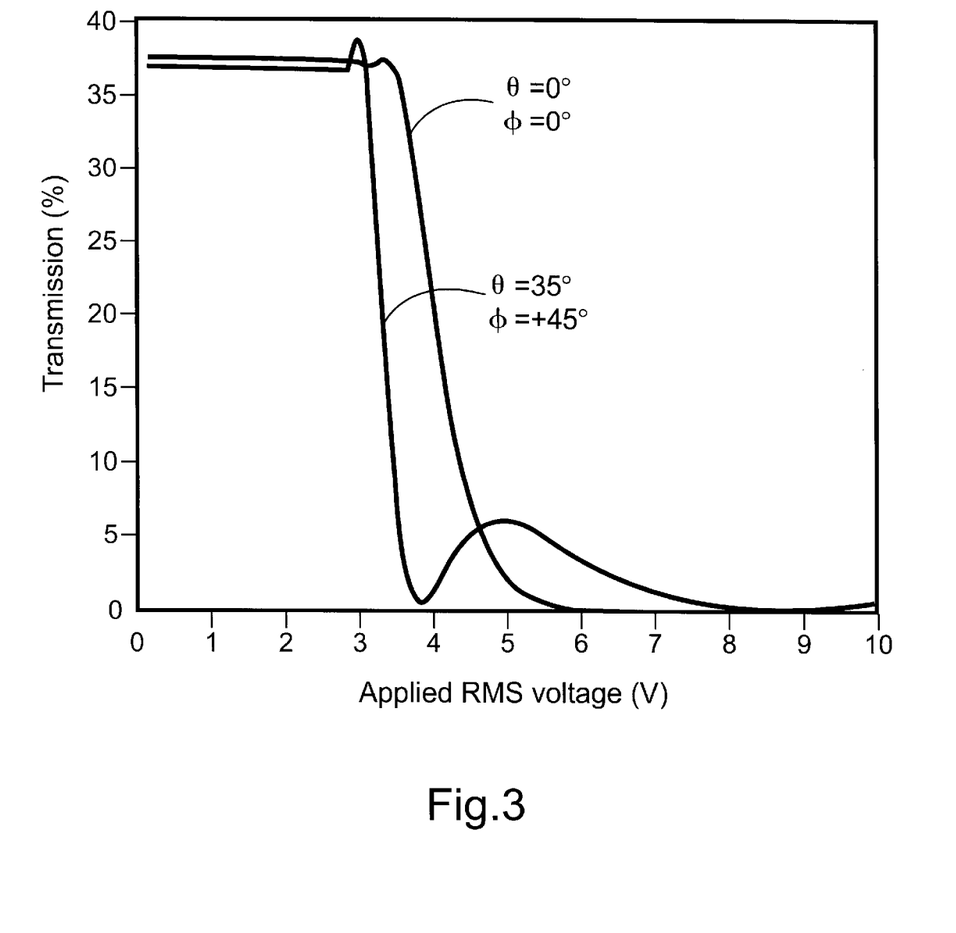
FIG. 3 shows the variation of electro-optic response for normal illumination and for the optimal angle.

FIG. 3 shows an example of the improvement in electro-optic performance that results from the invention. It show the transmission as a function of applied voltage for standard normal incidence and for the optimal angle. The curve for the optimised angle clearly show the more rapid change of transmission with voltage as compared with the case of normal incidence.

Figure 4:
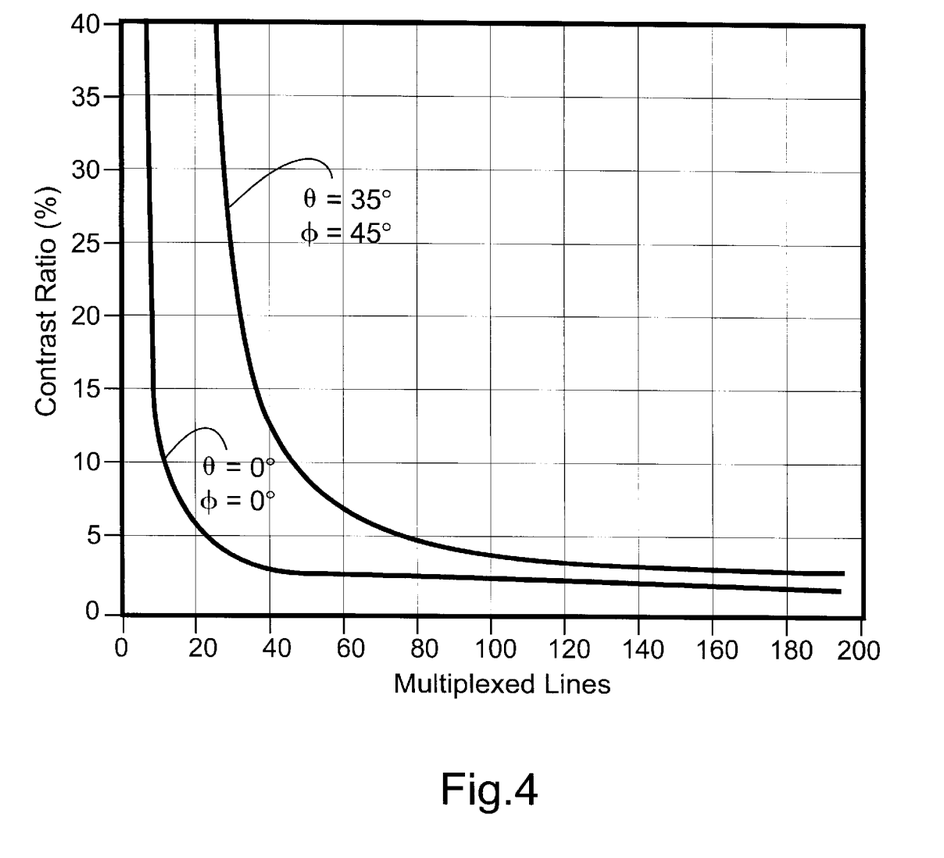
FIG. 4 show an example of the improvement in multiplexability that the invention provides.

FIG. 4 show details of the contrast calculated for the liquid crystal of FIG. 3. As can be seen, for a given required contrast ration the number of multiplexed lines possible is much higher for the optimised angle case than form normal incidence.

Figure 5:
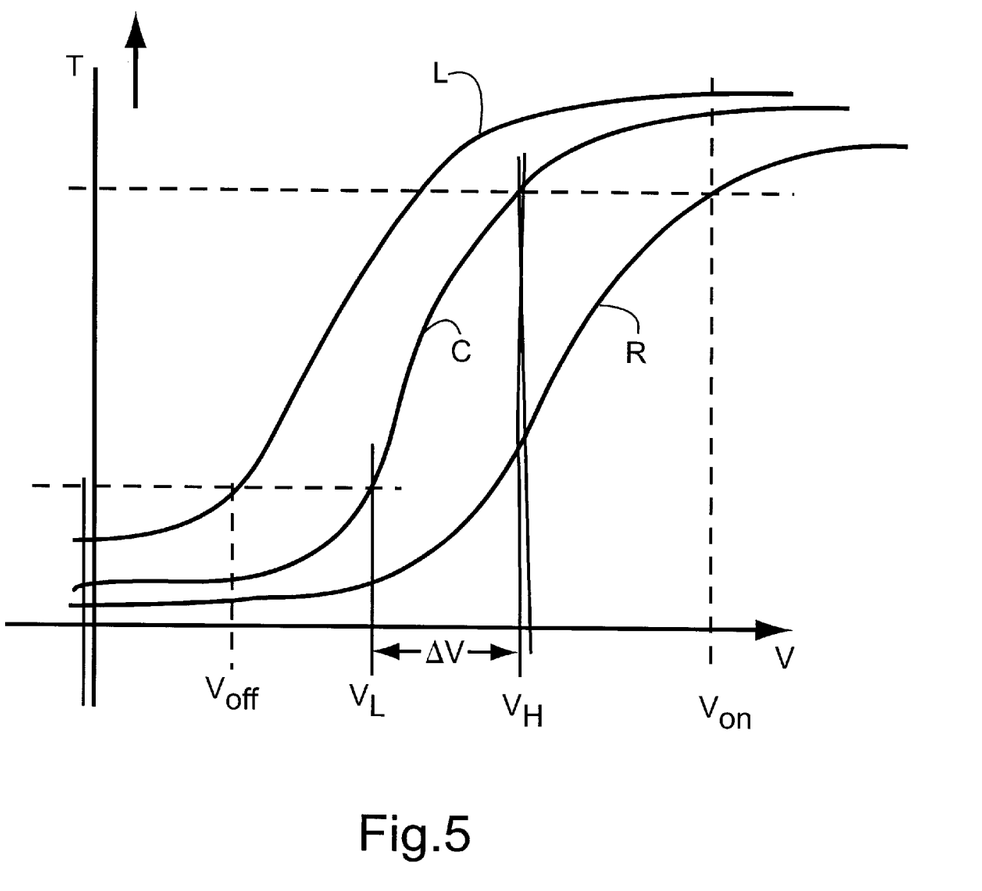
FIG. 5 illustrates the basis of the multiplexing technique of embodiments of the invention.

FIG. 5 illustrates how this increase in multiplexability is achieved. It show curves of transmission T against rms voltage V applied to a liquid crystal cell, in arbitrary units, though for a typical TN cell the voltage would be of the order of a few volts. In a typical TN cell, for instance, the rms voltages applied to the cell to change its state between light and dark have to vary over a range W between a minimum $V_{off}$ and a maximum $V_{on}$ which are dictated by being toward the bottom of the flank of the left-hand curve L and towards the top of the right-hand curve R respectively. These two curves are representative of a family of curves representing the different responses of the liquid crystal to the various directions and wavelengths of the prior white-light displays. Because of this spread of response the range of voltage which it is necessary to apply to switch a white-light uncollimated display satisfactorily is large, so the multiplexing capacity is small.

With the invention on the other hand there is only a single response curve, as shown by C. For the same response range, therefore, the range ΔV of drive voltage between off and on voltage $V_L$ and VH is much narrower than the corresponding range W for white light. Moreover the curve itself is steeper. Hence the cell can be multiplexed to a far greater extent. Alternatively for the same degree of multiplexing the contrast can be greatly increased.

Similar considerations apply for designing an STN display. Here (for twist angles of 180" of more) there is the advantage that the optimal angle of incidence of the excitation light is in fact normal to the plane, which is much more convenient for a practical flat-panel display.

Figure 6:
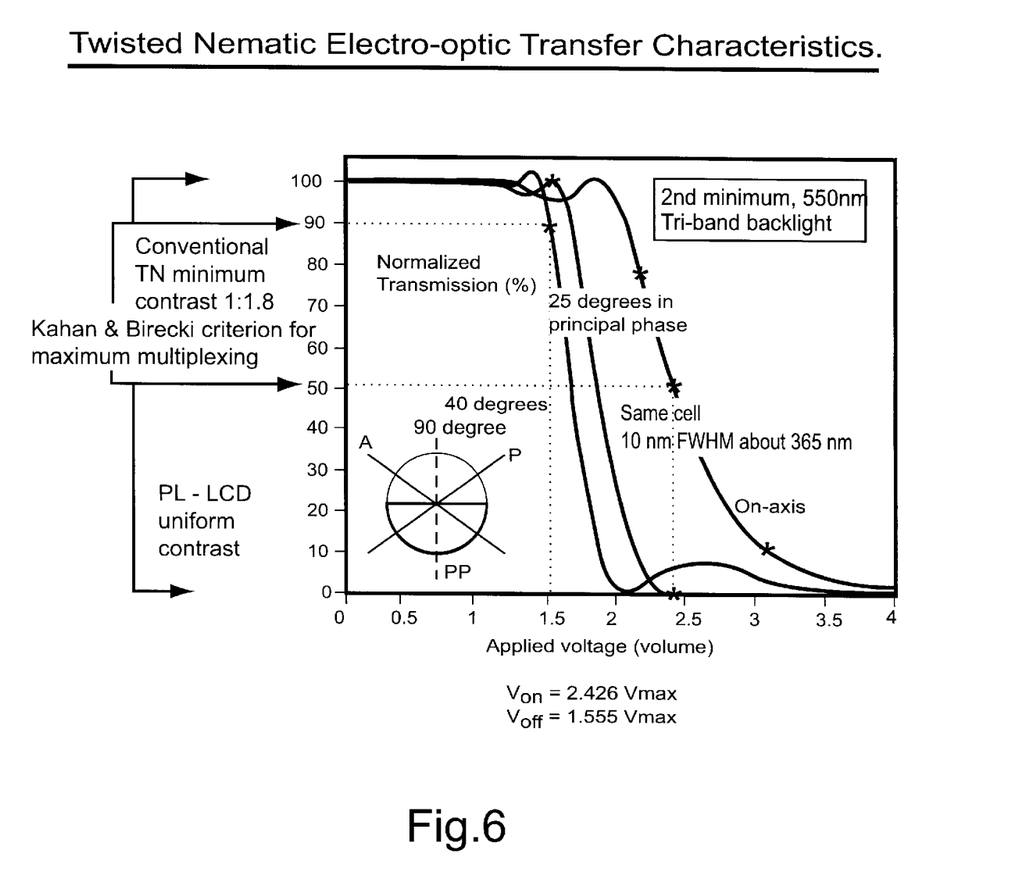
FIG. 6 shows a comparison of the response of TN cells according to the prior art and the invention.

FIG. 6 shows a comparison of the electro-optic transfer characteristics for a TN cell. The thin curves represent two different viewing angles, normal and 40°, in the conventional configuration, and the thick curve is a similar plot for the angle of optimal contrast, namely 25°, which is therefore the angle preferably used for the phosphor configuration of the invention. The liquid crystal is a low-level multiplexing liquid crystal mixture ZLI-2293 operating in normally white mode with the rear polarisation direction perpendicular to the rear rubbing direction. The thickness of the cell corresponds to the second minimum to 550 nm.

The contrast obtainable depends on the angle at which the cell is viewed. The inset circle illustrates the angles, showing a schematic view normal to the display. The Analyzer and Polariser are labelled A and P, and the "principal plane" is PP; this is the normal (perpendicular) plane mid-way between the analyzer and polarizer. The ideal viewing angle is at about 25 degrees from normal in the low-threshold quadrant, i.e. on the lower side in the diagram, in the principal plane. However, at other directions the contrast seen is much lower.

In the present case the optimum drive voltages for maximum number of multiplexing lines are $V_{ON}$=2.426V and $V_{OFF}$=1.555V, at which the minimum acceptable viewing conditions defined by Kahn and Birecki are met in the case of a viewing cone of 0 degrees to +40 degrees in the low threshold quadrant and +/−90 degrees in the other axis. This corresponds to 5.7 lines of multiplexing with a minimum contrast ratio of 1.8:1 and median CR of 8:1.

When operated in the PLLCD architecture the contrast is uniform and the viewing cone is +/−90 degrees in both axes by virtue of the phosphors; hence >70 lines can be multiplexed for a CR of 1.8:1, and approximately 30 lines for 8:1. The voltage range is reduced to less than ⅓ of that quoted above assuming that the illumination is optimised for the PLLCD case.

What is claimed is:
1. A liquid-crystal display comprising:
   a light source for producing excitation light at a predetermined narrow range of wavelengths,
   a LC cell formed from an array of pixels for modulating the excitation light, said LC cell having a white light contrast ratio determined by the applied voltage in the voltage range W, where W varies from $V_{off}$ to $V_{on}$, and an excitation light contrast ratio determined by the applied voltage in the voltage range $\Delta V$, where $\Delta V$ varies from $V_L$ to $V_H$ a collimator for directing the excitation light through said LC cell, a photoluminescent screen arranged to emit a visible output when struck by the narrow-band excitation light passing through the cell, and a drive circuit for addressing the LC cell in multiplexed manner;

wherein $\Delta V$ is less than $\frac{1}{3}$ W.

2. A display according to claim 1, in which the liquid crystal is nematic.

3. A display according to claim 2, in which the liquid crystal is twisted nematic and the angle of incidence of the excitation light to the plane of the display is at an angle to the normal.

4. A display according to claim 2, in which the liquid crystal is of the supertwisted nematic type and the angle of incidence of the excitation light is normal to the plane of the display.

5. A display according to claim 4 and having no colour correction plate.

6. A display according to claim 4, in which the twist angle is 180°.

7. A display according to claim 2, in which the liquid crystal has a twist angle of 0°.

8. A display according to claim 1, in which the contrast ratio between the on and off states is at least 1.8 and there are at least 30 multiplexed rows of pixels.

9. A display according to claim 1, wherein said collimator directs said excitation light to strike the liquid crystal cell at a predetermined angle of incidence with respect to a normal to the surface of said liquid crystal cell.

10. A display according to claim 1, wherein said photoluminescent screen is located on the cell.

11. A liquid-crystal display comprising:

a light source for producing excitation light at a predetermined narrow range of wavelengths an LC cell formed from a array of pixels for modulating the excitation light, said LC cell having a multiplex limit of n rows of said pixels which can be modulated with said excitation light and a multiplex limit of m rows of pixels which can be modulated by white light, where n and m are numbers;

a collimator for directing the excitation light through said LC cell, and a photoluminescent screen arranged to emit a visible output when struck by the narrow-band excitation light passing through the cell wherein n>>m.

12. A display according to claim 11, wherein said collimator directs said excitation light to strike the liquid crystal cell at a predetermined angle of incidence with respect to a normal to the surface of said liquid crystal cell.

13. A display according to claim 11, wherein said photoluminescent screen is located on the cell.

* * * * *